(12) United States Patent
Tanimoto

(10) Patent No.: US 6,787,751 B2
(45) Date of Patent: Sep. 7, 2004

(54) DRIVE APPARATUS FOR CCD IMAGE SENSOR

(75) Inventor: Takashi Tanimoto, Gifu-ken (JP)

(73) Assignee: Sanyo Electric Co., Ltd., Osaka (JP)

( * ) Notice: Subject to any disclaimer, the term of this patent is extended or adjusted under 35 U.S.C. 154(b) by 351 days.

(21) Appl. No.: 09/775,402

(22) Filed: Feb. 1, 2001

(65) Prior Publication Data

US 2001/0025913 A1 Oct. 4, 2001

(30) Foreign Application Priority Data

Feb. 4, 2000 (JP) .................................. 2000-026894
Feb. 4, 2000 (JP) .................................. 2000-026896
Feb. 4, 2000 (JP) .................................. 2000-026897

(51) Int. Cl.[7] .......................................... H01L 27/00
(52) U.S. Cl. ............................. 250/208.1; 250/214.1
(58) Field of Search ...................... 250/208.1, 214.1, 250/214 R; 327/536, 537, 390; 257/223, 229–234

(56) References Cited

U.S. PATENT DOCUMENTS 5,777,317 A * 7/1998 Maki ........................ 250/208.1
6,140,630 A * 10/2000 Rhodes ..................... 250/208.1
6,211,510 B1 * 4/2001 Merrill et al. ............ 250/208.1
6,476,371 B2 * 11/2002 Miida ....................... 250/208.1

FOREIGN PATENT DOCUMENTS

JP          11-112887          4/1999

* cited by examiner

Primary Examiner—David V. Bruce
Assistant Examiner—Hoon Song
(74) Attorney, Agent, or Firm—Fish & Richardson P.C.

(57) ABSTRACT

A drive apparatus that guarantees the stable operation of a CCD image sensor. The drive apparatus includes a drive circuit for supplying a pulse signal to the CCD image sensor. A power supply circuit is connected to the drive circuit to supply the drive circuit with a voltage for generating the pulse signal. The power supply circuit includes an over-boosting circuit for temporarily over-boosting the voltage supplied to the drive circuit to generate an over-boosted voltage, prior to the charge transfer operation of the CCD image sensor.

11 Claims, 8 Drawing Sheets

Fig.6(a) IN
Fig.6(b) Pin
Fig.6(c) Nin
Fig.6(d) OUT

Fig.8(b) Pin

Fig.8(c) Nin

Fig.8(d) OUT

DRIVE APPARATUS FOR CCD IMAGE SENSOR

BACKGROUND OF THE INVENTION

The present invention relates to a drive apparatus for driving a charge coupled device (CCD) solid state image sensor, and, more particularly, to the stable operation of a CCD image sensor and cost reduction for the drive apparatus.

A frame transfer type CCD image sensor, which has the following advantages, is used in cameras or the like.

(1) The efficiency of using light is enhanced.

(2) It is easy to increase the pixel density (to increase the resolution).

The CCD image sensor includes an image sensing section, which performs photoelectric conversion, and a storage section, which is arranged separate from the image sensing section and temporarily stores charges acquired by the photoelectric conversion.

A frame transfer type CCD image sensor further includes a horizontal transfer section which outputs the charges stored in the storage section. The CCD image sensor repeats (1) vertical transfer for transferring the charges acquired by photoelectric conversion to the storage section from the image sensing section at a predetermined time period and (2) horizontal transfer for transferring the charges stored in the storage section to an output section row by row at a high speed.

A drive apparatus, which drives a frame transfer type CCD image sensor, includes a vertical driver, which applies a vertical transfer pulse signal to the image sensing section and storage section, and a horizontal driver, which applies a horizontal transfer pulse signal to the storage section and horizontal transfer section.

The drive apparatus further includes a timing control circuit which generates a timing clock signal in accordance with a system clock signal and provides the timing clock signal to the vertical and horizontal drivers. The timing clock signal determines the timing of generating pulse signals which are output from the vertical and horizontal drivers.

The pulse voltages of the pulse signals, which are output from the vertical and horizontal drivers, are set to a system voltage or a voltage which is acquired by stepping the system voltage up or down by using a power supply circuit.

In the frame transfer type CCD image sensor, applying the vertical transfer pulse signal to the image sensing section causes charges, which are acquired by photoelectric conversion, to be vertically transferred to the storage section from the image sensing section, and applying the horizontal transfer pulse signal to the horizontal transfer section causes horizontal transfer of the stored charges from the horizontal transfer section.

The vertical transfer of charges to the storage section requires a high voltage. Even with a required voltage supplied to the vertical driver from the power supply circuit, therefore, the voltage supplied from the power supply circuit temporarily drops at the time of vertical transfer. It takes a certain time for the dropped voltage to return to the desired voltage level. This affects the vertical transfer operation of the image sensing section.

This problem occurs in an interline type CCD image sensor as well as a frame transfer type CCD image sensor. The interline type CCD image sensor includes an image sensing stage, which performs photoelectric conversion, and a transfer stage, which is coupled in parallel to the image sensing stage and transfers charges, which are acquired by the photoelectric conversion, to a horizontal transfer section. The charge transfer by the transfer stage requires a high voltage, and a voltage supplied to an apparatus for driving the transfer stage also temporarily drops.

A drive circuit, which includes a vertical driver and a horizontal driver, and a power supply circuit are formed separately on a semiconductor integrated circuit substrate. This design is disadvantageous in reducing the yield of a drive apparatus, which includes the drive circuit and the power supply circuit, and cost increase of the drive apparatus. Further, the drive circuit and the power supply circuit, which are provided separately, should face restrictions on mounting on the substrate. This stands in the way of making a CCD-image-sensor drive apparatus compact.

Figure 1:
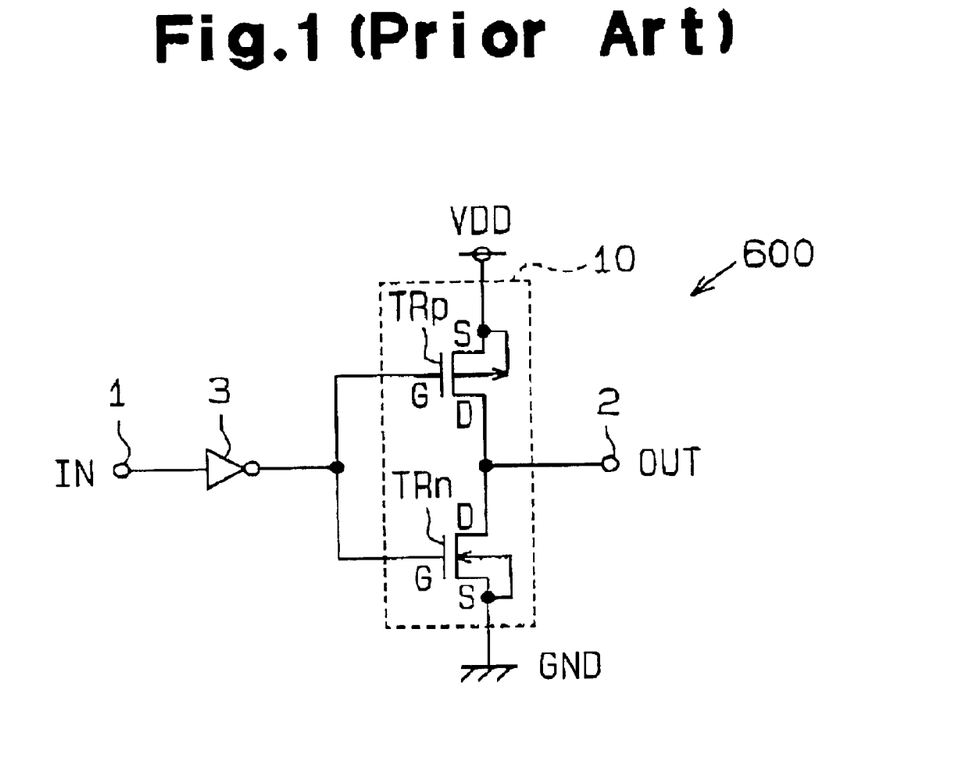
FIG. 1 is a schematic circuit diagram of a conventional buffer circuit.

FIG. 1 is a schematic circuit diagram of a buffer circuit 600 which is used in a CCD-image-sensor drive apparatus. The buffer circuit 600 includes an input inverter circuit 3 and an output CMOS inverter circuit 10. The inverter circuit 10 includes a P channel MOS (PMOS) transistor TRp and an N channel MOS (NMOS) transistor TRn connected in series. The source S of the PMOS transistor TRp is connected to a system supply voltage VDD and the source S of the NMOS transistor TRn is connected to ground GND.

An input signal IN, which is supplied to an input terminal 1, is output from an output terminal 2 with a delay of a predetermined time determined by the operational delays of the input inverter circuit 3 and the output CMOS inverter circuit 10. When the buffer circuit 600 is used as an output buffer, the transistors TRp and TRn are designed to have sizes (current capacities) according to a load which is connected to the output terminal 2.

Even with a simple circuit structure, the buffer circuit 600 can delay signals and drive a load. When the transistors TRp and TRn of the output CMOS inverter circuit 10 perform switching actions, however, a non-negligible through current flows through the transistors.

In a load-driving buffer circuit, particularly, the through current of the output CMOS inverter circuit is greater than the through current of a CMOS inverter circuit which is simply used in logic inversion. This inevitably increases the power consumption of a driver which uses a plurality of buffer circuits each having an output CMOS inverter circuit.

SUMMARY OF THE INVENTION

Accordingly, a first object of the present invention is to provide a drive apparatus that guarantees the stable operation of a CCD image sensor.

A second object of the present invention is to provide a buffer circuit having an output CMOS inverter circuit with reduced power consumption.

In a first aspect of the present invention, an apparatus for driving a CCD image sensor performing charge transfer operation in accordance with a pulse signal is provided. The apparatus includes a drive circuit for supplying a pulse signal to the CCD image sensor. A power supply circuit is connected to the drive circuit to supply the drive circuit with a voltage for generating the pulse signal. The power supply circuit includes an over-boosting circuit for temporarily over-boosting the voltage supplied to the drive circuit to generate an over-boosted voltage, prior to the charge transfer operation of the CCD image sensor.

In a second aspect of the present invention, an apparatus for driving a CCD image sensor performing charge transfer operation in accordance with a pulse signal is provided. The apparatus includes a drive circuit for supplying a pulse signal to the CCD image sensor. A power supply circuit is connected to the drive circuit to supply the drive circuit with a voltage for generating the pulse signal. The drive circuit and the power supply circuit are formed on a single semiconductor integrated circuit substrate.

In a third aspect of the present invention, a buffer circuit is provided. The buffer circuit includes a CMCS inverter circuit including a P channel MOS transistor and an N channel MOS transistor, which are connected in series. An input signal is supplied to gates of the P channel and N channel MOS transistors. A timing adjusting circuit is connected to the CMOS inverter circuit to adjust a timing of supplying the input signal to the gates of the P channel and N channel MOS transistors such that the P channel and N channel MOS transistors are turned on at different timings.

In a fourth aspect of the present invention, a driver is provided. The driver includes a plurality of functional circuits including a first functional circuit having a relatively high frequency of operations and a second functional circuit having a relatively low frequency of operations. The first functional circuit includes a first buffer circuit having a first CMOS inverter circuit having a first P channel MOS transistor and a first N channel MOS transistor, which are connected in series. A first timing adjusting circuit is connected to the first CMOS inverter circuit to supply first and second switching signals to gates of the first P channel MOS transistor and the first N channel MOS transistor such that in a period during which one of the first P channel and first N channel MOS transistors is turned off, the other one of the first P channel and first N channel MOS transistors is turned on. The second functional circuit includes a second buffer circuit having a second CMOS inverter circuit having a second P channel MOS transistor and a second N channel MOS transistor, which are connected in series. A second timing adjusting circuit is connected to the second CMOS inverter circuit to receive an input signal and supply a third switching signal to the gate of the second P channel MOS transistor such that an ON timing of the second P channel MOS transistor is delayed and an ON duration of the second P channel MOS transistor is shorter than an OFF duration of the second N channel MOS transistor. The second timing adjusting circuit supplies a fourth switching signal to the gate of the second N channel MOS transistor such that an ON timing of the second N channel MOS transistor is delayed and an ON duration of the second N channel MOS transistor is shorter than an OFF duration of the second P channel MOS transistor.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIGS. 4A to 4E are timing charts illustrating the operation of the CCD-image-sensor drive apparatus of FIG. 2;

FIGS. 6A to 6D are timing charts illustrating tho operation of the buffer circuit of FIG. 5;

FIGS. 8A to 8D are timing charts illustrating the operation of the buffer circuit of FIG. 7;

DETAILED DESCRIPTION OF THE PREFERRED EMBODIMENT

In the drawings, like numerals are used for like elements throughout.

Figure 2:
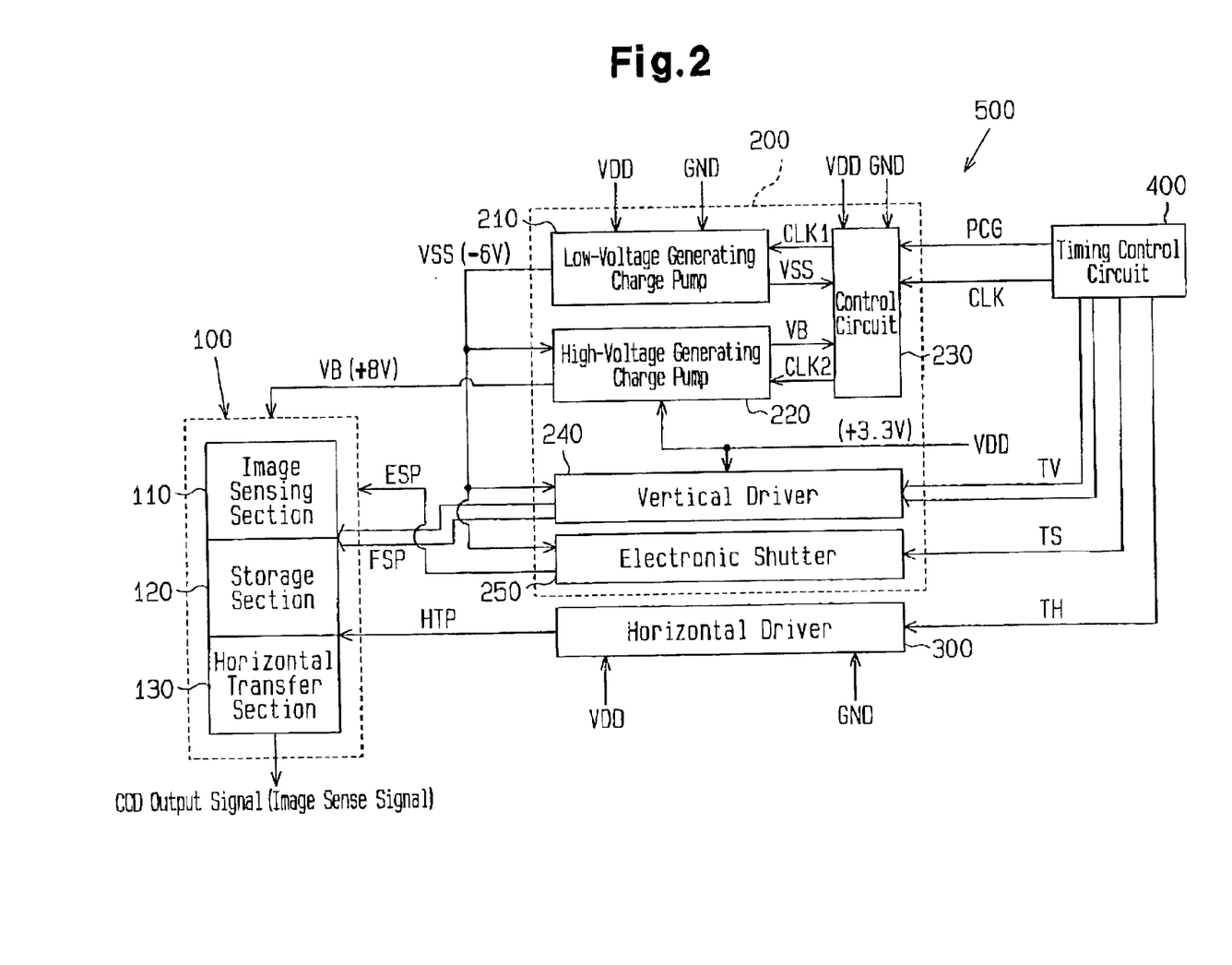
FIG. 2 is a schematic block diagram of a CCD-image-sensor drive apparatus according to a first embodiment of the present invention.

As shown in FIG. 2, a CCD-image-sensor drive apparatus 500 according to a first embodiment of the present invention drives a CCD image sensor 100. The CCD image sensor 100 includes an image sensing section 110, which performs photoelectric conversions a storage section 120, which temporarily stores charges acquired by the photoelectric conversion, and a horizontal transfer section 130, which transfers the charges stored in the storage section 120 to an output section (not shown).

The image sensing section 110 generates charges corresponding to an irradiated light image through photoelectric conversion. Since the quantity of charges, which are generated by photoelectric conversion, is proportional to the luminous intensity and the storage time, an image sense signal according to the pattern of the charges generated at each pixel is formed.

The charges are fast transferred from the image sensing section 110 to the storage section 120 frame by frame (frame shift) in a predetermined vertical transfer period. By the time frame shift is completed, all of the charges have been transferred to the storage section 120 from the image sensing section 110, so that the same charge pattern as the one produced by the image sensing section 110 is formed in the storage section 120. The charge pattern is output to an unillustrated signal processing system through a predetermined horizontal transfer operation.

At the time of horizontal transfer, the charges, which are temporarily stored in the storage section 120, are transferred to the output section (not shown) line by line from the horizontal transfer section 130. The output section generates the image sense signal of the CCD image sensor 100 in accordance with the transferred charges. Using this horizontal transfer period, the image sensing section 110 performs photoelectric conversion on a next light image.

The CCD image sensor 100 performs an electronic shutter operation for discharging unnecessary charges, which are generated in the non-photoelectric conversion period of the image sensing section 110, to a drain (not shown).

The drive apparatus 500 of the CCD image sensor 100 includes a power/drive circuit IC 200, a horizontal driver 300 and a timing control circuit 400. The power/drive circuit IC 200 includes a power supply circuit and a drive circuit. The power supply circuit has a low-voltage generating charge pump 210, a high-voltage generating charge pump 220 and a control circuit 230. The drive circuit has a vertical driver 240 and an electronic shutter 250. According to the first embodiment, the power supply circuit and the drive circuit are integrated on a single semiconductor substrate (one chip IC).

The vertical driver 240 provides a drive pulse signal (frame shift pulse signal) FSP for vertical transfer of charges to the image sensing section 110 and the storage section 120. The electronic shutter 250 supplies the image sensing section 110 with a drive pulse signal ESP for draining charges to ensure an electronic shutter operation. The drive pulse signal FSP of the vertical driver 240 is generated in accordance with a timing signal TV supplied from the timing control circuit 400. The pulse voltage of the drive pulse signal ESP of the electronic shutter 250 is produced in accordance with a timing signal TS provided from the timing control circuit 400. Further, the pulse voltages of the drive pulse signals FSP, ESP are produced by an output voltage VSS (e.g., −6 V) of the low-voltage generating charge pump 210 and a system supply voltage VDD (e.g., 3.3 V).

Figure 3:
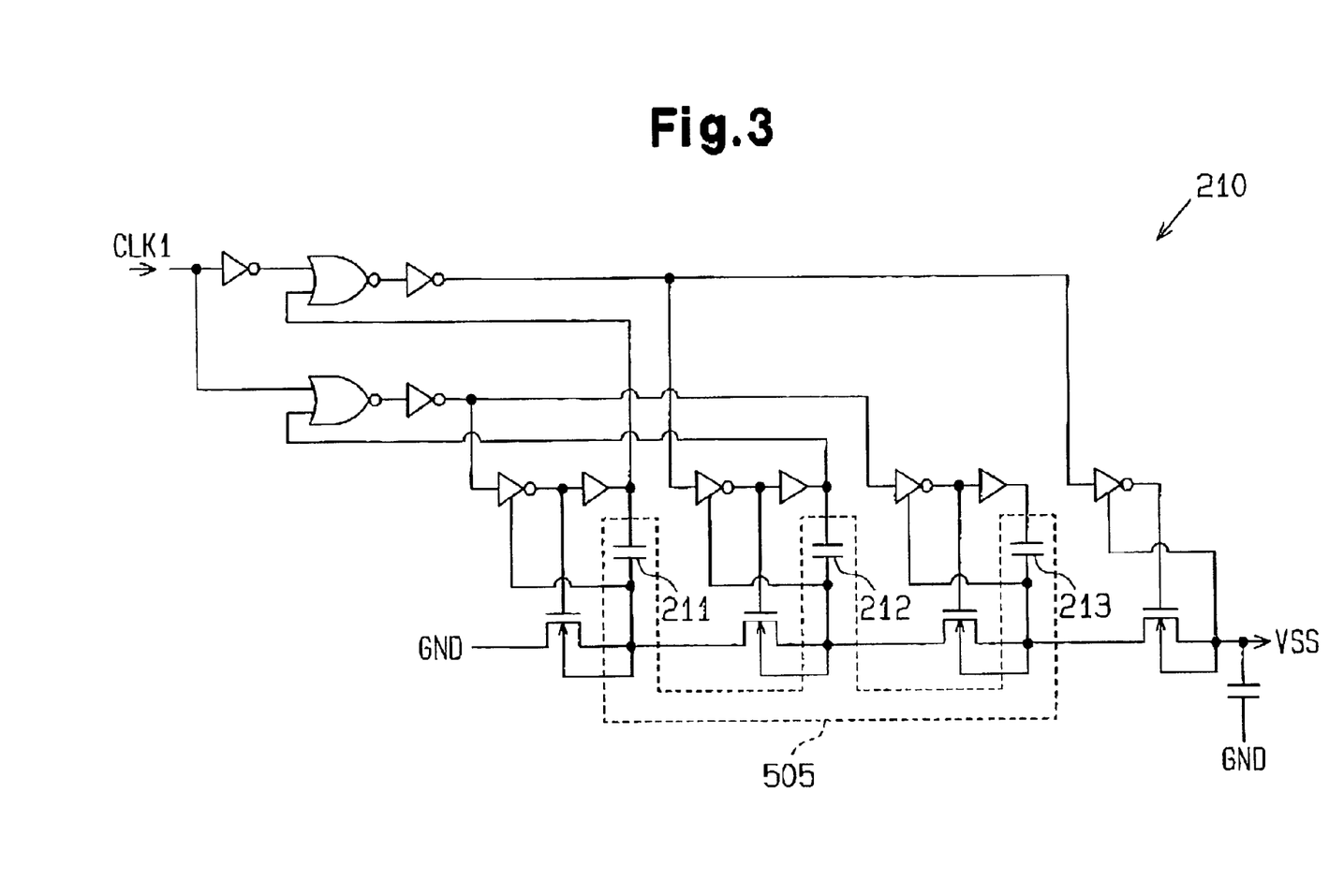
FIG. 3 is a schematic circuit diagram of a low-voltage generating charge pump of the CCD-image-sensor drive apparatus of FIG. 2.

The low-voltage generating charge pump 210 performs a boosting operation toward the negative voltage side in accordance with a boost clock signal CLK1 supplied from the control circuit 230, The reason for performing the boosting operation toward the negative voltage side is that the voltage, which is supplied to the vertical driver 240 and the electronic shutter 250, is a negative voltage. As shown in FIG. 3, the charge pump 210 has an external device 505 externally attached to the power/drive circuit IC 200. The external device 505 includes three capacitors 211, 212 and 213, When the boost clock signal CLK1 is supplied to the charge pump 210, for example, the capacitor 211 produces the output voltage VSS of −3.3V, the capacitor 212 produces the output voltage VSS of −6.6 V and the capacitor 213 produces the output voltage VSS of −9.9 V. The control circuit 230 thins a clock signal CLK, which is output from the timing control circuit 400 and generates the boost clock signal CLK1. The control circuit 230 thins the clock signal CLK such that the output voltage VSS is maintained at a predetermined voltage (e.g., −6 V), while monitoring the output voltage VSS of the low-voltage generating the charge pump 210. That is, the control circuit 230 performs constant voltage control on the output voltage VSS.

The high-voltage generating charge pump 220 basically has the same structure as the low-voltage generating charge pump 210. The control circuit 230 performs constant voltage control on the output voltage VB of the high-voltage generating charge pump 220. The output voltage VB (e.g., +8 V) is used as a bias voltage to the CCD image sensor 100.

The horizontal driver 300 provides a drive pulse signal HTP for horizontal transfer of charges to the storage section 120 and the horizontal transfer section 130. The drive pulse signal HTP is produced in accordance with a timing signal TH supplied from the timing control circuit 400. The pulse voltage of the drive pulse signal HTP is generated only by the system supply voltage VDD (e.g., 3.3 V) supplied. This is because the horizontal transfer operation of the CCD image sensor 100 does not require a high voltage compared to the case of the vertical transfer operation.

According to the first embodiment, the one-chip power/drive circuit IC 200 is formed by integrating the power supply circuit and the drive circuit. The integration makes it possible to fabricate the power supply circuit and the drive circuit at a time. This leads to cost reduction of the CCD-image-sensor drive apparatus and improvement of the yield. The structure also reduces the restrictions at the time of mounting the power/drive circuit IC 200 on the substrate, making it easier to design the CCD-image-sensor drive apparatus more compact.

According to the first embodiment, the timing control circuit 400 is designed so that the boost clock signal CLK is supplied to the control circuit 230 from the timing control circuit 400 in the period in which the output of the image sense signal from the CCD image sensor 100 is stopped. This particular design is taken to prevent noise from being generated by the boost clock signals CLK1, CLK2 bursting in the image sense signal output from the CCD image sensor 100.

According to the first embodiment, the output voltage VSS, which is supplied to the vertical driver 240 and the electronic shutter 250 from the low-voltage generating charge pump 210, is temporarily over-boosted prior to the vertical transfer operation of the CCD image sensor 100. At the time of over-boosting, a precharge instruction signal PCG is supplied to the control circuit 230 from the timing control circuit 400 immediately before the vertical transfer operation. The control circuit 230 stops the constant voltage control on the charge pump 210 for a predetermined period in accordance with the precharge instruction signal PCG. As a result, the thinning of the boost clock signal CLK is stopped and the output voltage VSS of the charge pump 210 is over-boosted.

FIGS. 4A to 4E are timing charts for explaining the operation of the CCD-image-sensor drive apparatus 500.

Figures 4A, 4E:
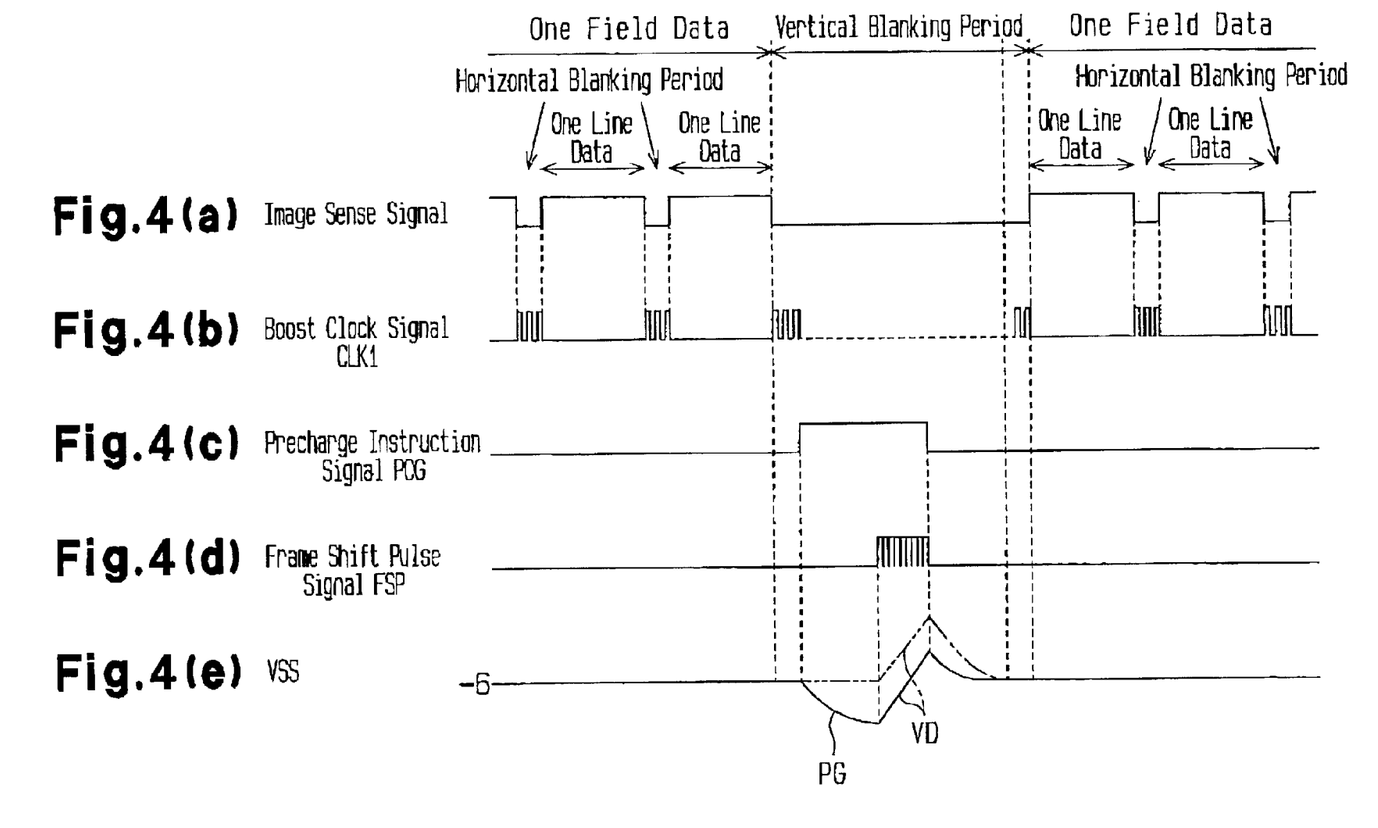

As shown in FIG. 4A, one line data is horizontally transferred every horizontal line in one sensed image. At the time of the data transfer, as well known, every time one line data is transferred, the horizontal blanking period is set. Every time line data for one sensed image (one field of line data in the case of interlacing) is transferred, the vertical blanking period is set. The horizontal blanking period and the vertical blanking period are set in accordance with the scanning characteristic of a CRT (Cathode Ray Tube) display device.

The CCD-image-sensor drive apparatus 500 according to the first embodiment causes the timing control circuit 400 to supply the boost clock signal CLK to the control circuit 230 as shown in FIG. 4B using the horizontal blanking period and the vertical blanking period. The boost clock signal CLK1 is generated by thinning the clock for constant voltage control in the control circuit 230.

As apparent from the above, the power supply circuit performs the boosting operation in the period where the image sense signal from the CCD image sensor 100 is not output. This prevents noise from being produced by the bursting of the boost clock signal CLK1 in the image sense signal.

Prior to the vertical transfer operation of the CCD image sensor 100, the timing control circuit 400 provides the precharge instruction signal PCG to the control circuit 230 as shown in FIG. 4C. The control circuit 230 temporarily stops thinning the clock for constant voltage control in accordance with the precharge instruction signal PCG. Accordingly, the low-voltage generating charge pump 210 performs an over-boosting operation (precharging) with the maximum boosting power and generates an over-boosted output voltage. The over-boosted output voltage is indicated by a solid line PG in FIG. 4E.

After the precharge instruction signal PCG is supplied, the vertical driver 240 outputs the frame shift pulse signal FSP, thus starting the vertical transfer operation, as shown in FIG. 4D. At this time, the output voltage VSS drops as indicated by a solid line VD in FIG. 4E due to relatively large current consumption of the vertical driver 240. The output voltage VSS drops during the vertical transfer period. Because the output voltage VSS has been over-boosted (precharged), however, the influence of the voltage drop is minimized. What is more, even when the constant voltage control by the control circuit 230 resumes after the vertical transfer operation, the time for the output voltage VSS to return to the target control voltage (e.g., −6 V) is significantly shortened.

The two-dot chain line in FIG. 4E indicates the output voltage VSS when over-boosting (precharging) has not been performed. In this case, the output voltage VSS drops considerably so that it takes a long time for the output voltage VSS to return to the target control voltage.

The CCD-image-sensor drive apparatus 500 according to the first embodiment has the following advantages.

(1) Prior to the vertical transfer operation of the CCD image sensor 100, the output voltage VSS, which is supplied to the drive circuit (vertical driver 240 and electronic shutter 250) from the power supply circuit (low-voltage generating charge pump 210), is temporarily over-boosted. This minimizes the influence of the voltage drop and significantly shortens the time for the output voltage VSS to return to the target control voltage, which guarantees the stable operation of the CCD image sensor 100.

(2) The power supply circuit is provided with the control circuit 230 that performs constant voltage control on the output voltage VSS. At the time of over-boosting the output voltage, the constant voltage control of the control circuit 230 is disabled. It is therefore possible to suitably manage the over-boosting of the output voltage VSS and the constant voltage control at the same time.

(3) The control circuit 230 performs constant voltage control by thinning the clock, which is supplied to the charge pump type boosting circuit, and over-boosts the output voltage by disabling the thinning of the clock. This permits the power supply circuit to be designed compact, so that constant voltage control and over-boosting are performed under relatively simple control.

(4) Since the drive apparatus 500 is used for a frame transfer type CCD image sensor which has a voltage drop caused by the vertical transfer operation, the operation of the frame transfer type CCD image sensor becomes stable.

(5) The drive circuit, which includes the vertical driver 240 and the electronic shutter 250, and the power supply circuit, which includes the low-voltage generating charge pump 210, the high-voltage generating charge pump 220 and the control circuit 230, are integrated into a single-chip semiconductor integrated circuit (IC). This eliminates the need for connecting the drive circuit to the power supply circuit via printed interconnecting lines, thus achieving cost reduction of the CCD-image-sensor drive apparatus 500 and an improved yield.

(6) The vertical driver 240 and the electronic shutter 250, which demand a higher-withstand-voltage structure, and the power supply circuit, which inherently demands a high-withstand-voltage structure, are integrated into a single-chip semiconductor IC device. It is therefore easy to manufacture the drive apparatus 500.

(7) The power supply circuit operates while the output of the image sense signal from the CCD image sensor 100 is stopped. This prevents noise from being produced in the single-chip semiconductor IC device in which the power supply circuit and drive circuit are integrated.

(8) As shown in FIG. 4A, there is a blank period where the output of the image sense signal from the CCD image sensor 100 is stopped before and after vertical transfer. This blank period is relatively long. Over-boosting (precharging) is performed efficiently by operating the power supply circuit using the blank period.

The first embodiment may be modified as follows.

The falling timing of the precharge instruction signal PCG is not limited to the one shown in FIG. 4C. It is preferable that the rising timing of the precharge instruction signal PCG should last at least until the output of the frame shift pulse signal FSP starts.

At least the low-voltage generating charge pump 210 and the vertical driver 240 may be formed on a single semiconductor IC substrate.

The invention may be adapted to an interline type CCD image sensor as well as a frame transfer type CCD image sensor.

The boosting circuit for the power supply circuit is not limited to a charge pump type. Whichever type one selects, it is desirable to perform constant voltage control according to the boosting circuit selected. It is also desirable that the boosting circuit has a capacity of boosting the voltage higher than the voltage which is controlled constant.

The power supply circuit should not necessarily be subjected to constant voltage control, but may be designed so that the output voltage of the power supply circuit is temporarily over-boosted.

The system supply voltage VDD and the output voltage VSS of the power supply circuit can be changed arbitrarily.

The system of transferring the image sense signal is not limited to the one that is synchronous with the CRT scanning characteristic.

Figure 5:
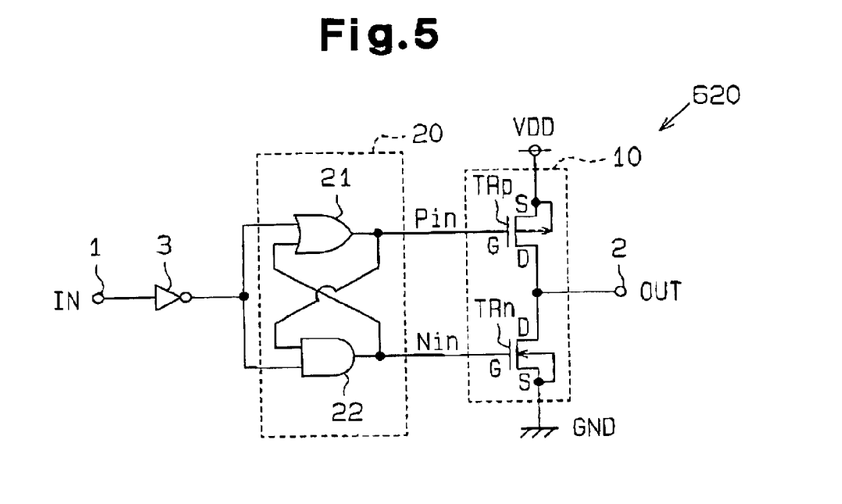
FIG. 5 is a schematic circuit diagram of a buffer circuit according to a second embodiment of the present invention.

As shown in FIG. 5, a buffer circuit 620 according to a second embodiment of the present invention includes an input inverter circuit 3, a timing adjusting circuit 20 and an output CMOS inverter circuit 10. The output CMOS inverter circuit 10 includes a PMOS transistor TRp and an NMOS transistor Trn, which are connected in series. The timing adjusting circuit 20 includes an OR circuit 21 and an AND circuit 22. The OR circuit 21 has a first input terminal, which is connected to the output terminal of the input inverter circuit 3, and a second input terminal, which is connected to the output terminal of the AND circuit 22. The output terminal of the OR circuit 21 is connected to the first input terminal of the AND circuit 22 and the gate of the PMOS transistor TRp. A switching signal Pin is supplied to the gate of the PMOS transistor TRp from the OR circuit 21.

The second input terminal of the AND circuit 22 is connected to the output terminal of the input inverter circuit 3. A switching signal Nin is supplied to the OR circuit 21 and the gate of the NMOS transistor TRn from the AND circuit 22.

The operation of the buffer circuit 620 will be described with reference to FIGS. 6A through 6D.

Figure 6A:
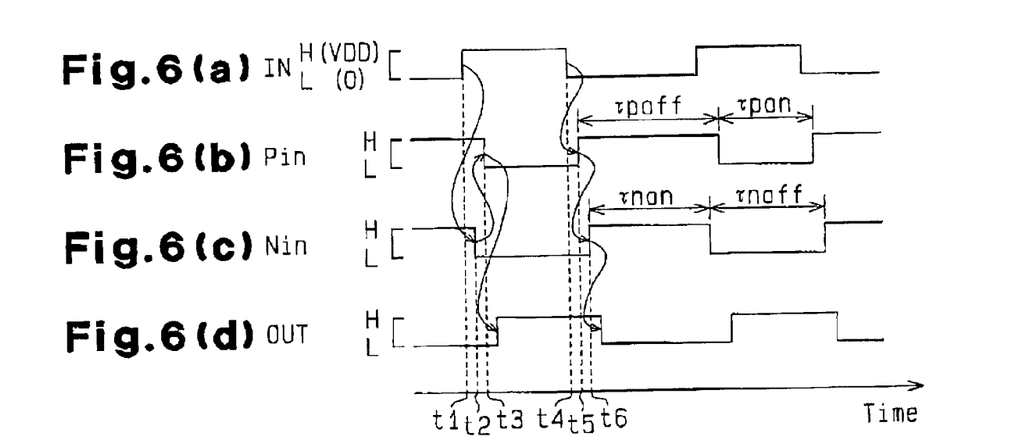

When the input signal IN changes to a logic H (High) level (VDD) at time t1, as shown in FIG. 6A, the input inverter circuit 3 outputs an inverted signal having a logic L (Low) level (0 volt). At time t2 which is a predetermined time passed after time t1, the switching signal Nin having an L level is output from the AND circuit 22, turning off the NMOS transistor TRn, as shown in FIG. 6C.

At time t3 which is a predetermined time passed from the point when the L-level signal is supplied to the OR circuit 21 from the AND circuit 22, the switching signal Pin having an L level is output from the OR circuit 21, turning on the PMOS transistor TRp as shown in FIG. 6B. As a result, the buffer circuit 620 outputs an output signal OUT having an H level as shown in FIG. 6D.

When the input signal IN changes to an L level at time t4, the input inverter circuit 3 outputs an inverted signal having an H level. At time t5 which is a predetermined time passed after time t4, the switching signal Pin having an H level is output from the OR circuit 21, turning off the PMOS transistor TRp.

At time t6 which is a predetermined time passed from the point when the H-level signal is supplied to the AND circuit 22 from the OR circuit 21, the switching signal Nin having an H level is output from the AND circuit 22, turning on the NMOS transistor TRn as shown in FIG. 6C. As a result, the buffer circuit 620 outputs an output signal OUT having an L level as shown in FIG. 6D.

According to the second embodiment, the on period τnon of the NMOS transistor TRn is set within the off period τpoff of the PMOS transistor TRp, and the on period τpon of the PMOS transistor TRp is set within the off period τnoff of the NMOS transistor TRn. Therefore, the transistors TRp and TRn are not turned on at the same time. This prevents the through current from flowing in the transistors TRp and TRn.

The buffer circuit 620 according to the second embodiment has the following advantages.

(1) The timing adjusting circuit 20 respectively supplies the switching signals Pin and Nin to the transistors TRp and TRn such that the transistors TRp and TRn are turned on at different timings. This prevents the through current from flowing in the transistors TRp and TRn, thus reducing the power consumption of the buffer circuit 620.

(2) Since the timing adjusting circuit 20 includes logic circuit, or the OR circuit 21 and the AND circuit 22, the switching signals Pin and Nin, which are produced by those logic circuits, have a high reliability.

The second embodiment may be modified as follows.

The timing adjusting circuit 20 is not limited to the logic circuits shown in FIG. 5, but may be any circuit, which generates the switching signals Pin and Nin and does not allow the transistors TRp and TRn from being turned on simultaneously.

The source S of the NMOS transistor TRn may be connected to a negative potential instead of the ground GND.

Figure 7:
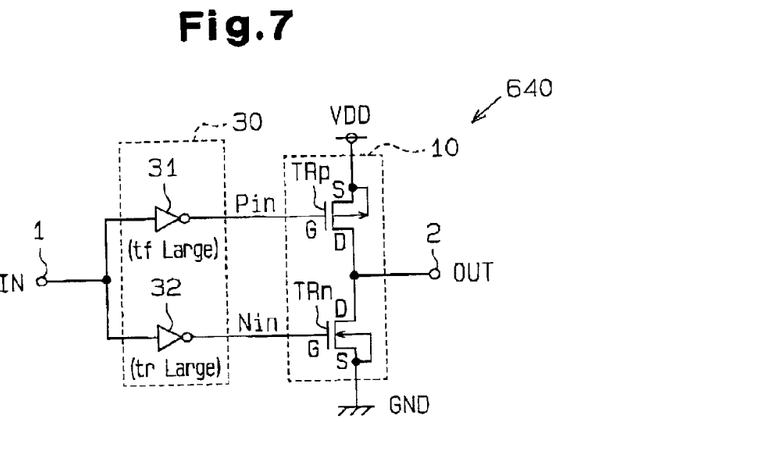
FIG. 7 is a schematic circuit diagram of a buffer circuit according to a third embodiment of the present invention.

As shown in FIG. 7, a buffer circuit 640 according to a third embodiment of the present invention has a timing adjusting circuit 30 and an output CMOS inverter circuit 10.

The timing adjusting circuit 30 includes first and second inverter circuits 31, 32. The first inverter circuit 31 is designed so that the signal falling time constant at the time of signal inversion is greater than the signal falling time constant of the second inverter circuit 32. That is, the signal falling time tf1 of the inverted signal of the first inverter circuit 31 is longer than the signal falling time tf2 of the inverted signal of the second inverter circuit 32. The second inverter circuit 32 is designed so that the signal rising time constant at the time of signal inversion is greater than the signal rising time constant of the first inverter circuit 31. That is, the signal rising time tr2 of the inverted signal of the second inverter circuit 32 is longer than the signal rising time tr1 of the inverted signal of the first inverter circuit 31. The first inverter circuit 31 inverts the input signal IN and provides the inverted input signal as the switching signal Pin to the gate of the PMOS transistor TRp. The second inverter circuit 32 inverts the input signal IN and provides the inverted input signal as the switching signal, Nin to the gate of the NMOS transistor TRn.

The operation of the buffer circuit 640 will be described with reference to FIGS. 8A through 8D.

Figure 8A:
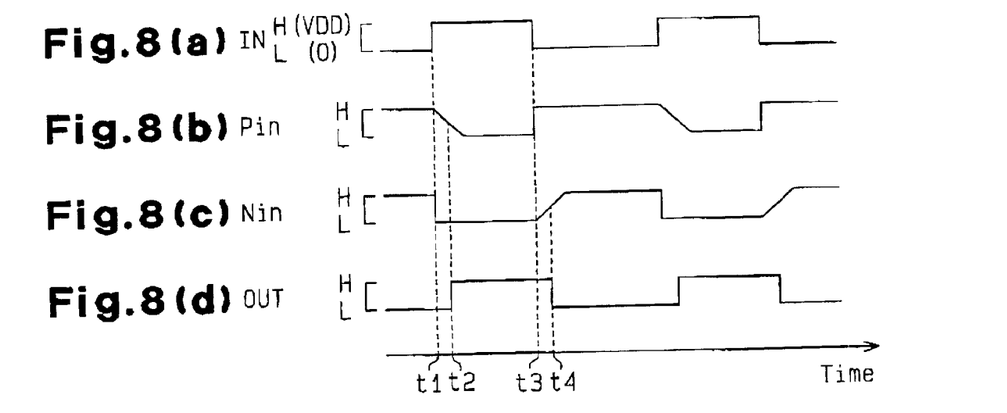

When the input signal IN changes to an H level at time t1, as shown in FIG. 8A, the second inverter circuit 32 outputs the switching signal Nin having an L level (see FIG. 8C), turning off the NMOS transistor TRn. In accordance with the transition of the input signal IN to the H level, the level of the switching signal Pin output from the first inverter circuit 31 gradually decreases (see FIG. 8B). When the level of the switching signal Pin drops near the L level at time t2 or a predetermined time after time t1, the PMOS transistor TRp is turned on and the buffer circuit 640 outputs the output signal OUT having an H level (see FIG. 8D).

When the input signal IN changes to an L level at time t3, the first inverter circuit 31 outputs the switching signal Pin having an H level (see FIG. 8B), turning off the PMOS transistor TRp. In accordance with the transition of the input signal IN to the L level, the level of the switching signal Nin output from the second inverter circuit 32 gradually rises (see FIG. 8C). When the level of the switching signal Nin rises to a predetermined level at time t4 which is a predetermined time passed after time t3, the NMOS transistor TRn is turned on and the buffer circuit 640 outputs the output signal CUT having an L level (see FIG. 8D).

According to the third embodiment, at time t2 after a predetermined time has passed from time t1 when the NMOS transistor TRn was turned off, the PMOS transistor TRp is turned on. At time t4 after a predetermined time has passed from time t3 when the PMOS transistor TRp was turned off, the NMOS transistor TRn is turned on. Therefore, the transistors TRp and TRn are not turned on at the same time. This prevents the through current from flowing in the transistors TRp and TRn.

The buffer circuit 640 according to the third embodiment has the following advantages.

(1) The timing adjusting circuit 30 respectively supplies the switching signals Pin and Nin to the transistors TRp and TRn such that the transistors TRp and TRn are not turned on simultaneously. This prevents the through current from flowing in the transistors TRp and TRn, thus reducing the power consumption of the buffer circuit 640.

(2) The timing adjusting circuit 30 takes the form of a simple circuit including two inverter circuits 31 and 32. Therefore, the buffer circuit 640 can be formed simply and at a low cost.

The third embodiment may be modified as follows.

The timing adjusting circuit 30 is not limited to the circuit structure shown in FIG. 7, but may be any circuit, which generates the switching signals Pin and Nin and does not allow the transistors TRp and TRn from being turned on simultaneously.

The source S of the NMOS transistor TRn may be connected to a negative potential instead of the ground GND.

Figure 9:
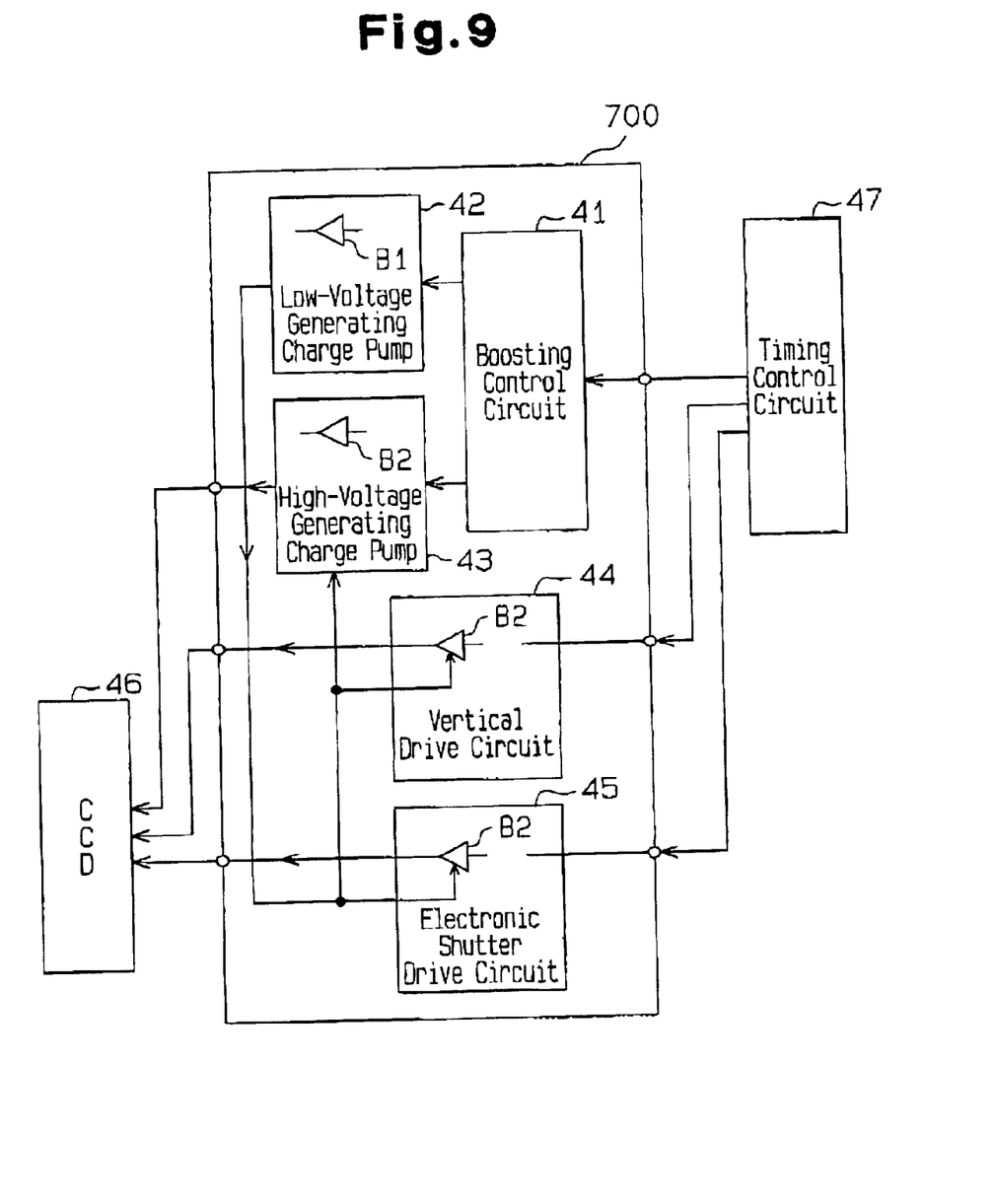
FIG. 9 is a schematic block diagram of a driver circuit according to a fourth embodiment of the present invention.

As shown in FIG. 9, a driver 700 according to a fourth embodiment of the invention drives, for example, a frame transfer type CCD image sensor 46 of a well-known type. The driver 700 performs so-called vertical charge transfer driving of transferring charges, which are generated in the image sensing section of the CCD image sensor 46, to the storage section. It is preferable that the driver 700 be formed on a single semiconductor IC substrate.

The driver 700 has a boosting control circuit 41, a low-voltage generating charge pump 42, a high-voltage generating charge pump 43, a vertical drive circuit 44 and an electronic shutter drive circuit 45.

The boosting control circuit 41 controls the low-voltage generating charge pump 42 and the high-voltage generating charge pump 43 in accordance with a boost clock signal supplied to from a timing control circuit 47 which generates various clock signals for driving the CCD image sensor.

The low-voltage generating charge pump 42 generates a boosted voltage of, for example, −3 V (VDD) by boosting the system power supply voltage VDD to the negative voltage side under the control of the boosting control circuit 41. The boosted voltage is supplied to the high-voltage generating charge pump 43, the vertical drive circuit 44 and the electronic shutter drive circuit 45.

Figure 10:
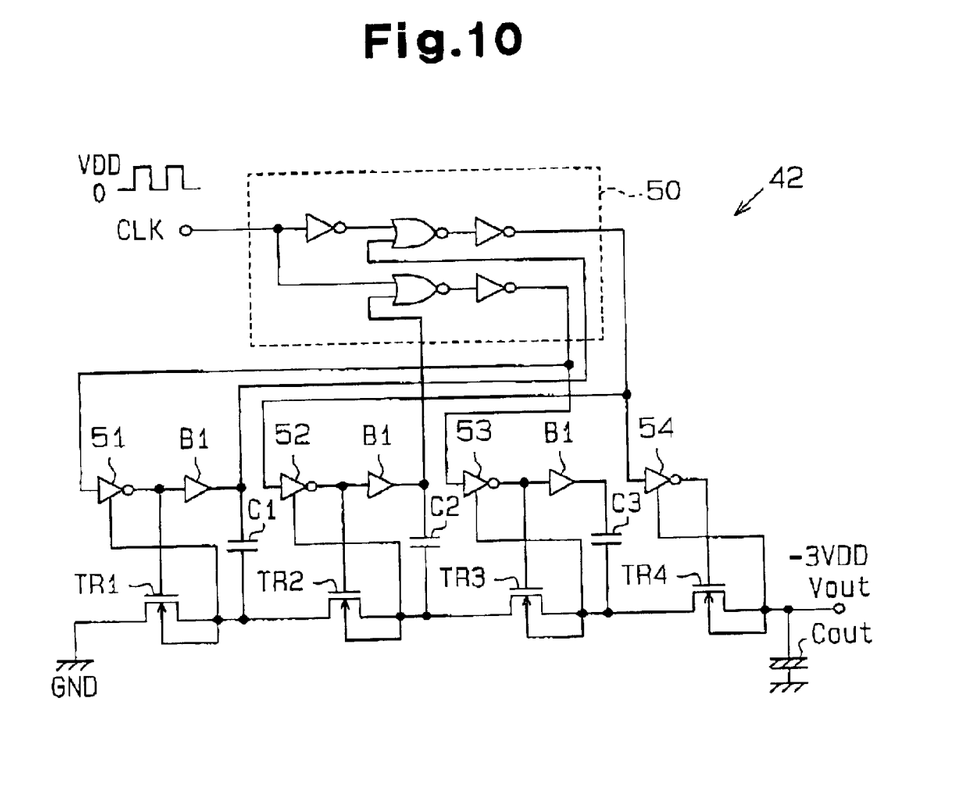
FIG. 10 is a schematic circuit diagram of a charge pump circuit of the driver of FIG. 9.

As shown in FIG. 10, the charge pump 42 has four switching transistors TR1, TR2, TR3 and TR4, three pumping capacitors C1, C2 and C3 externally connected to the CCD driver 700, an output capacitor Cout, a timing adjusting circuit 50, CMOS inverters 51, 52, 53 and 54, and three buffer circuits (AND/OR type buffer circuits) B1 of the type shown in FIG. 5. The timing adjusting circuit 50 adjusts the timings for clock signals, which is supplied to the switching transistors TR1–TR4, such that the transistors TR1–TR4 are not simultaneously enabled by the clock signals. The CMOS inverters 51–54 are used to surely maintain the OFF states of the transistors TR1–TR4.

The three AND/OR type buffer circuits B1 respectively buffer pumping clock signals supplied to the pumping capacitors C1–C3. The low-voltage generating charge pump 42 has a high frequency of operations and has relatively large switching-originated power consumption. The use of the buffer circuits B1 in this charge pump 42 prevents the through current of the buffer circuits B1 and reduces the power consumption of the charge pump.

The high-voltage generating charge pump 43 generates a predetermined high voltage (positive voltage) for biasing the CCD image sensor 46 from the system supply voltage VDD and the boosted voltage from the low-voltage generating charge pump 42. The high voltage is supplied to the CCD image sensor 46.

The charge pump 43 fundamentally has the same structure as the charge pump 42 of FIG. 10. The charge pump 43 includes switching transistors, pumping capacitors, an output capacitor, a timing adjusting circuit, CMOS inverters and buffer circuits (tr/tf type buffer circuits) B2 of the type shown in FIG. 7. To generate a positive voltage, PMOS transistors are used as the switching transistors.

The tr/tf type buffer circuits B2 buffer pumping clock signals supplied to the pumping capacitors. The high-voltage generating charge pump 43 has transistors of relatively large sizes in order to generate a high voltage. Each tr/tf type buffer circuit 82 has a relatively small circuit area. The through current of the buffer circuits B2 is prevented while preventing the circuit area of the charge pump 43 from increasing.

In the vertical blanking period, the vertical drive circuit 44 converts a CCD vertical transfer clock signal, which is supplied from the timing control circuit 47, to a vertical transfer pulse signal having a predetermined level (three-value level including a negative voltage) based on the system power supply voltage VDD and the boosted voltage of the low-voltage generating charge pump 42. The vertical transfer pulse signal is supplied to the CCD image sensor 46 and one screen of charges, which is generated by the image sensing section of the CCD image sensor 46, are transferred to the storage section.

The vertical drive circuit 44 is comprised of a tr/tf type buffer circuit B2 and has an output buffer circuit which buffers the vertical transfer pulse signal. The tr/tf type buffer circuit B2 is used in the vertical drive circuit 44 which has a low frequency of operations. This prevents the through current of the output buffer circuit, thus reducing the power consumption of the vertical drive circuit 44.

In the light accumulation period, the electronic shutter drive circuit 45 converts an electronic-shutter clock signal, which is supplied from the timing control circuit 47, to an electronic-shutter pulse signal having a predetermined level based on the system power supply voltage VDD and the boosted voltage of the low-voltage generating charge pump 42. The electronic-shutter pulse signal is supplied to the CCD image sensor 46, causing the charges in the image sensing section of the CCD image sensor 46 to be discharged to the drain.

The electronic shutter drive circuit 45 is comprised of a tr/tf type buffer circuit B2 and has an output buffer circuit which buffers the electronic-shutter pulse signal. The tr/tf type buffer circuit B2 is used in the electronic shutter drive circuit 45 which has a low frequency of operations. This prevents the through current of the output buffer circuit, thus reducing the power consumption of the electronic shutter drive circuit 45.

The driver 700 according to the fourth embodiment has the following advantage.

The AND/OR type buffer circuits B1 and the tr/tf type buffer circuit B2 are adequately arranged in the charge pumps 42 and 43 and the drive circuits 44 and 45 in accordance with the structures of the individual circuits of the driver 700. This reduces the power consumption of the charge pumps 42 and 43 and the drive circuits 44 and 45 and prevents the circuit area from increasing.

The fourth embodiment may be modified as follows.

The AND/OR type buffer circuits B1 and the tr/tf type buffer circuit B2 may be used in the circuits in the driver 700 excluding the charge pumps 42 and 43 and the drive circuits 44 and 45.

The driver that drives an interline type CCD image sensor may have AND/OR type buffer circuits B1 and the tr/tf type buffer circuits B2.

The buffer circuit according to the present invention is not limited to a driver which drives a CCD image sensor but may be adapted to a semiconductor IC device having a buffer circuit. For example, a driver having a plurality of functional circuits which have different frequencies of operations and operate on different voltages may have AND/OR type buffer circuits B1 and the tr/tf type buffer circuits B2 adequately arranged in each functional circuits in accordance with the frequencies of operations and the operational voltages.

It should be apparent to those skilled in the art that the present invention may be embodied in many other specific forms without departing from the spirit or scope of the invention. Therefore, the present examples and embodiments are to be considered as illustrative and not restrictive and the invention is not to be limited to the details given herein, but may be modified within the scope and equivalence of the appended claims.

What is claimed is:

1. An apparatus for driving a CCD image sensor which performs charge transfer operation in accordance with a pulse signal, comprising:

a drive circuit for supplying a pulse signal to the CCD image sensor; and a power supply circuit, connected to the drive circuit, for supplying the drive circuit with a voltage for generating the pulse signal, wherein the power supply circuit includes an over-boosting circuit for temporarily over-boosting the voltage supplied to the drive circuit to generate an over-boosted voltage exceeding a target control voltage for a predetermined time, prior to the charge transfer operation of the CCD image sensor.

2. The apparatus according to claim 1, wherein the power supply circuit includes a constant voltage control circuit that performs constant voltage control on the voltage supplied to the drive circuit, and wherein the constant voltage control circuit is inactivated when the over-boosting circuit is executing an over-boosting operation.

3. The apparatus according to claim 2, wherein the over-boosting circuit is a charge pump type boosting circuit that performs a boosting operation in accordance with a clock signal, and the constant voltage control circuit thins the clock signal in the constant voltage control and supplies a thinned clock signal to the charge pump type boosting circuit, and wherein constant voltage control circuit supplies the clock signal without thinning the clock signal to the charge pump type boosting circuit when the charge pump type boosting circuit performs the over-boosting operation.

4. The apparatus according to claim 1, wherein the CCD image sensor is a frame transfer type CCD image sensor including an image sensing section for generating charges by performing photoelectric conversion and a storage section, located separate from the image sensing section, for temporarily storing charges transferred from the image sensing section; and wherein the drive circuit includes a vertical driver for generating a pulse signal for charge transfer from the image sensing section to the storage section.

5. The apparatus according to claim 1, wherein the drive circuit and the power supply circuit are formed on a single semiconductor integrated circuit substrate.

6. The apparatus according to claim 5, wherein the CCD image sensor generates an image sensor output signal in accordance with charges every predetermined period, and the power supply circuit is enabled when the CCD image sensor is stopping generation of the image sensor output signal.

7. An apparatus for driving a CCD image sensor which performs charge transfer operation in accordance with a pulse signal, comprising:
   a drive circuit for supplying a pulse signal to the CCD image sensor, and
   a power supply circuit, connected to the drive circuit, for supplying the drive circuit with a voltage for generating the pulse signal; and wherein the drive circuit and the power supply circuit are formed on a single semiconductor integrated circuit substrate, wherein the CCD image sensor generates an image sensor output signal every predetermined period in accordance with charges, and the power supply circuit is enabled when the image sensor stops generating image sensor output signals.

8. The apparatus according to claim 7, wherein the CCD image sensor is a frame transfer type CCD image sensor including an image sensing section for generating charges by performing photoelectric conversion and a storage section, located separate from the image sensing section, for temporarily storing charges transferred from the image sensing section, and wherein the drive circuit includes a vertical driver for generating a pulse signal for charge transfer from the image sensing section to the storage section.

9. The apparatus according to claim 7, wherein the power supply circuit includes a charge pump type boosting circuit for performing a boosting operation in accordance with a clock signal.

10. The apparatus according to claim 9, wherein the power supply circuit includes a constant voltage control circuit for thinning a clock signal and supplying a thinned clock signal to the charge pump type boosting circuit to perform constant voltage control on the voltage supplied to the drive circuit, the constant voltage control circuit supplies the clock signal without thinning to the charge pump type boosting circuit prior to the charge transfer operation of the CCD image sensor, and wherein the charge pump type boosting circuit temporarily over-boosts the voltage supplied to the drive circuit from the power supply circuit in accordance with the clock signal to produce an over-boosted voltage.

11. An apparatus for driving a CCD image sensor which performs charge transfer operation in accordance with a pulse signal, comprising:
   a drive circuit for supplying a pulse signal to the CCD image sensor, and
   a power supply circuit, connected to the drive circuit, for supplying the drive circuit with a voltage for generating the pulse signal; and
   a control circuit connected to the power supply circuit, for controlling the power supply circuit, wherein the drive circuit, the power supply circuit and the control circuit are formed on a single semiconductor integrated circuit substrate, wherein the CCD image sensor generates an image sensor output signal every predetermined period in accordance with charges, and wherein the control circuit enables the power supply circuit when the image sensor stops generating image sensor output signals.

* * * * *